United States Patent Office 3,397,142
Patented Aug. 13, 1968

3,397,142
PROCESS FOR THE ELIMINATION OF
ANIONS FROM A SOLUTION
Jean Louis Guth and Raymond Wey, Mulhouse, France,
assignors to Commissariat à l'Energie Atomique, Paris,
France
No Drawing. Filed Jan. 18, 1965, Ser. No. 426,378
Claims priority, application France, Jan. 27, 1964,
961,688
3 Claims. (Cl. 210—24)

ABSTRACT OF THE DISCLOSURE

Removes anions derived from oxyacids in an aqueous solution at temperatures of 200° C. and above by passing said solution through nepheline hydrate, an aluminosilicate.

---

This invention relates to a process whereby anions derived from oxyacids are eliminated from a neutral or alkaline aqueous solution at temperatures in the vicinity of or higher than 200° C. under the corresponding steam pressure.

There has not been known to exist up to the present time any simple and economic process whereby anions derived from oxyacids of different kinds could be separated at high temperatures from an aqueous solution. Such a process has a large number of potential applications, among which can be cited by way of example the purification of the cooling fluid of a nuclear reactor when the coolant employed is steam.

The process in accordance with the invention is essentially characterized in that a neutral or alkaline solution containing anions derived from oxyacids is contacted with an aluminosilicate such as nepheline hydrate I at temperatures in the vicinity of or higher than 200° C. under the corresponding steam pressure.

Nepheline hydrate I, which is an aluminosilicate corresponding to the formula $Al_2O_3$, $2SiO_2$, $Na_2O$, $H_2O$ and having an orthorhombic structure, can be obtained by hydrothermal synthesis at temperatures in the vicinity of 300° C.

The present applicants have perfected an original method of preparation which makes it possible to obtain nepheline hydrate I in a high state of purity starting from a temperature of 250° C.

One example of preparation of nepheline hydrate I will be given hereinafter.

When put in the presence of a solution containing anions such as $(SO_4)^{-2}$, $(CrO_4)^{-2}$, $(MoO_4)^{-2}$, $(CO_3)^{-2}$, $(PO_4)^{-3}$, $(WO_4)^{-2}$, nepheline hydrate I collects these anions and is transformed into a compound having a structure which is similar to that of natural cancrinite. This absorption takes places in a neutral or basic medium and at temperatures which are in the vicinity of or higher than 200° C. under the corresponding steam pressure.

The solutions containing anions derived from oxyacids to be eliminated must be either neutral or alkaline, while the $(OH)^-$ ion concentration can vary between wide limits, preferably within the range of 0 to 4 g. ions/liter. The temperature of the medium is in the vicinity of or higher than 200° C.

The process is carried out in vessels which are resistant both to pressure and to alkaline corrosion. Copper tubes placed in an autoclave can be employed for this purpose.

There now follows a description of one example of execution of the process according to this invention, said example being given without any limitation being implied. It will further be understood that the present invention is not limited to the mode of operation described herein but is intended to include within its scope all alternative forms which come within the definition of equivalent chemical means.

Example

The tests were carried out in an autoclave at 250° C. with variable pH values and variable concentrations of $(SO_4)^{-2}$ ions. In a first series of experiments, the concentration of $(OH)^-$ ions was maintained constant and the concentration of $(SO_4)^{-2}$ ions was progressively increased. In a second series of experiments, the concentration of sulfate ions was maintained constant and the $(OH)^-$ ion concentration was progressively increased.

Samples of 250 mg. of nepheline hydrate I prepared as indicated below were put in the presence of a constant volume fixed at 5 cm.³ of solution containing the $(SO_4)^{-2}$ and $(OH)^-$ ions. The results have been recorded in the two following tables:

TABLE I

Increasing concentration of $(SO_4)^{-2}$ constant initial concentration of hydroxyl ions $(OH)^- = N/2$

| Initial concentration $Na_2SO_4$, M/100 | Meq. $Na_2SO_4$ per 100 g. of nepheline hydrate I (prior to absorption) | Final concentration, $Na_2SO_4$, M/1000 | Meq. $Na_2SO_4$ in 100 g. of nepheline hydrate I (after absorption) |
|---|---|---|---|
| 0.87 | 35    | 0.56 | 32.7  |
| 1.20 | 52.5  | 0.49 | 50.5  |
| 1.74 | 70    | 3.52 | 56.4  |
| 2.17 | 87.5  | 2.25 | 78.4  |
| 2.61 | 105   | 3.52 | 90.8  |
| 3.04 | 122.5 | 4.09 | 106   |
| 3.48 | 140   | 7.10 | 111.5 |

TABLE II

Increasing $OH^-$ concentration, constant initial $SO_4^{2-}$ ion concentration (1.74 M/100)

| Initial $Na_2SO_4$ concentration, M/100 | Initial $OH^-$ concentration, M/2 | Initial meq. $Na_2SO_4$ per 100 g. of nepheline hydrate I | Final concentration, $Na_2SO_4$, M/1000 | Meq. $Na_2SO_4$ in 100 g. of nepheline hydrate I (after absorption) |
|---|---|---|---|---|
| 1.74 | 0    | 70 | 1.52 | 64   |
| 1.74 | 0.25 | 70 | 2.41 | 60.5 |
| 1.74 | 0.5  | 70 | 6.4  | 44   |
| 1.74 | 0.75 | 70 | 5.07 | 50   |
| 1.74 | 1    | 70 | 3.47 | 57   |
| 1.74 | 2    | 70 | 2.46 | 60   |
| 1.74 | 3    | 70 | 1.63 | 63.5 |

The nepheline hydrate I employed during the tests was prepared in the following manner:

A mixture of 1 mol/g. amorphous $SiO_2$, 1 g.-mole $Al(OH)_3$, 3.5 g.-mole NaOH, and 80 g.-mole $H_2O$ is heated to 250° C. in a copper-lined autoclave for a period of 9 days. Practically pure nepheline hydrate I is formed with a very high yield. The product obtained appears in the form of orthorhombic crystals of elongated shape and approximately 100 microns in length.

What we claim is:

1. In a process for eliminating anions derived from oxyacids from an aqueous solution at high temperatures under the corresponding steam pressure, the step of passing said aqueous solution containing anions derived from oxyacids at high temperature through nepheline hydrate which absorbs the anions.

2. Process in accordance with claim 1, said process taking place at a temperature at least equal to 200° C.

3. Process in accordance with claim 1, said solution containing the anions having an $(OH)^-$ ion concentration within the range of 0 to 4 g.-ion/liter.

References Cited

UNITED STATES PATENTS

| | | | |
|---|---|---|---|
| 1,916,367 | 7/1933 | Green | 210—24 X |
| 3,248,170 | 4/1966 | Kvetinskos | 23—111 |

OTHER REFERENCES

Dana's Textbook of Mineralogy, 4th Edition record by Wm. E. Ford, published by John Wiley & Sons, Inc., London: Chapman & Hall Ltd., pages 585–586 relied on, copy in group 173.

Hackh's Chemical Dictionary, 3rd edition, record by grant McGraw-Hill Book Co. Inc., New York, N.Y., copy in group 171, page 921 relied upon.

MORRIS O. WOLK, *Primary Examiner.*

S. MARANTZ, *Assistant Examiner.*